(12) United States Patent
Abhishek et al.

(10) Patent No.: US 7,483,995 B2
(45) Date of Patent: Jan. 27, 2009

(54) COORDINATING A TRANSITION OF A ROAMING CLIENT BETWEEN WIRELESS ACCESS POINTS USING ANOTHER CLIENT IN PHYSICAL PROXIMITY

(75) Inventors: Abhishek Abhishek, Woodinville, WA (US); Yue Chen, Bellevue, WA (US); Hui Shen, Issaquah, WA (US); Jiandong Ruan, Bellevue, WA (US); Taroon Mandhana, Redmond, WA (US); Yi Lu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 11/484,303

(22) Filed: Jul. 11, 2006

(65) Prior Publication Data
US 2007/0255834 A1 Nov. 1, 2007

Related U.S. Application Data

(63) Continuation of application No. 11/414,571, filed on Apr. 28, 2006.

(51) Int. Cl.
G06F 15/16 (2006.01)
H04Q 7/20 (2006.01)
H04Q 7/24 (2006.01)

(52) U.S. Cl. .................. 709/230; 709/204; 455/430; 455/436; 370/338; 370/400

(58) Field of Classification Search .................. None
See application file for complete search history.

(56) References Cited

U.S. PATENT DOCUMENTS

| | | | |
|---|---|---|---|
| 5,448,623 A * | 9/1995 | Wiedeman et al. | 455/430 |
| 6,377,691 B1 | 4/2002 | Swift | |
| 2001/0014158 A1 | 8/2001 | Baltzley | |
| 2003/0095524 A1 * | 5/2003 | Stephens et al. | 370/338 |
| 2003/0204562 A1 | 10/2003 | Hwang | |
| 2004/0001467 A1 | 1/2004 | Cromer | |

(Continued)

FOREIGN PATENT DOCUMENTS

WO  WO 03015315 A1  2/2003

OTHER PUBLICATIONS

Pack et al., "Fast Inter-AP Handoff Using Predictive Authentication Scheme in a Public Wireless LAN", Networks2002.doc, submitted to World Scientific Jun. 10, 2002.

*Primary Examiner*—Wen-Tai Lin
(74) *Attorney, Agent, or Firm*—Wolf, Greenfield & Sacks, P.C.

(57) ABSTRACT

Systems and methods for handling a transition of a roaming mobile user device (i.e., a roaming client) from one access point (AP) to a target AP, referred to herein as soft inter-AP handoff. This technique involves a second mobile user device that is already connected with the target AP, called a roaming coordinator, assisting in handoff coordination between the APs. This coordination includes assisting the roaming client in establishing a client-to-client connection to relay data traffic during the handoff, while the roaming client establishes a connection with the target AP using traditional techniques. Soft inter-AP handoff allows a faster hand-off between APs than traditional techniques, and may reduce jitter in communications with the roaming device during the transition.

17 Claims, 11 Drawing Sheets

U.S. PATENT DOCUMENTS

| | | |
|---|---|---|
| 2004/0068653 A1 | 4/2004 | Fascenda |
| 2004/0098586 A1 | 5/2004 | Rebo |
| 2004/0242228 A1 | 12/2004 | Lee |
| 2005/0060319 A1 | 3/2005 | Bretton |
| 2005/0074015 A1* | 4/2005 | Chari et al. ............. 370/400 |
| 2005/0143065 A1 | 6/2005 | Pathan |
| 2005/0238047 A1 | 10/2005 | Holland |
| 2005/0244000 A1 | 11/2005 | Coleman |
| 2005/0246779 A1 | 11/2005 | Yegin |
| 2006/0191000 A1* | 8/2006 | O'Hara et al. ............. 726/12 |
| 2007/0232307 A1* | 10/2007 | Ibrahim et al. ............. 455/436 |

* cited by examiner

|  | Old Address | New Address |
|---|---|---|
| Source Address | Roaming Client | Roaming Coordinator |
| Destination Address | No Change | |
| BSSID | Client-to-client BSSID | AP's BSSID |

*FIG. 10*

|  | MAC Old Address | MAC New Address |
|---|---|---|
| Source Address | No Change | |
| Destination Address | Roaming Coordinator | Roaming Client |
| BSSID | AP's BSSID | Client-to-client BSSID |

*FIG. 11*

|  | MAC Address |
|---|---|
| Source Address | Roaming Coordinator |
| Destination Address | Roaming Client |
| BSSID | Client-to-client BSSID |

*FIG. 12*

|  | MAC Address |
|---|---|
| Source Address | Roaming Coordinator |
| Destination Address | No Change |
| BSSID | AP's BSSID |

*FIG. 13*

COORDINATING A TRANSITION OF A ROAMING CLIENT BETWEEN WIRELESS ACCESS POINTS USING ANOTHER CLIENT IN PHYSICAL PROXIMITY

RELATED APPLICATIONS

This application is a continuation of U.S. application Ser. No. 11/414,571, entitled, "Coordinating a Transition of a Roaming Client Between Wireless Access Points Using Another Client in Physical Proximity," by Abhishek et al, filed Apr. 28, 2006, the entire contents of which is hereby incorporated by reference.

BACKGROUND

In wireless networking, a roaming user device (frequently referred to herein as a "roaming client") often transitions between wireless access points (APs) on one or more wireless networks.

As used herein, a "network" is a group of two or more components interconnected by one or more segments of transmission media over which communications may be exchanged between the components. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two components connected by a single wire, bus, wireless connection, or other type of segment. Further, it should be appreciated that when a network is illustrated in a drawing of this application as being connected to an element in the drawing, the connected element itself is considered part of the network.

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, transceivers, wireless access points (APs), repeaters, and any combinations thereof. As used herein, a "user device" is a network device from/to which a user may send/receive communications, and which may serve as an endpoint to communications on a communications network. User devices include, but are not limited to: workstations; personal computers (e.g., PCs); laptop computers, notebook computers; telephones (e.g., landline or mobile); pagers; Blackberry™ brand devices, PCS devices, personal digital assistants (PDAs), two-way radios (e.g., "walkie-talkies"), other types of user devices, and any suitable combination of the foregoing.

A network (e.g., any of networks 104, 106 and 108 described below) may be or include any of a variety of types of networks including, but not limited to, a local area network (LAN), a metropolitan area network (MAN), a wide-area network (WAN), a wireless network, a Public Land Mobile Network (PLMN), a Global System for Mobile Communications (GSM) network, a General Packet Radio Service (GPRS) network, a Universal Mobile Telecommunications System (UMTS) network, a Code-Division Multiple Access (CDMA) network, an optical network, a data network, an enterprise-wide network, a wireless personal area network (PAN), a home network, a telecommunications network, a public switched telephone network (PSTN), a broadband network, another type of network, or any suitable combination of the foregoing.

As used herein, a "wireless communications network" or "wireless network" is a communications network including a plurality of network resources that enable wireless communications between two or more of the plurality of network resources, including network devices and in particular, user devices. When the roaming client transitions, control of a connection between the roaming client and network resources must be handed off from one AP to another AP.

Handing off between APs involves terminating a connection between the roaming client and the current AP that provides the roaming device connectivity to network resources, and establishing a new connection between the roaming client and a new AP (i.e., the "target" AP) to maintain connectivity between the roaming client and network resources.

A roaming client typically experiences a connectivity loss during the handing off process between APs, for example, when IEEE 802.11 technology is employed. Accordingly, the roaming client typically stops transmitting and receiving data, and queues data traffic until connectivity is reestablished by establishing the connection with the target AP. Applications that require real-time wireless communication may experience "jitters" during this transition, as the roaming client terminates its connection with the old AP and establishes a new connection with the target AP.

SUMMARY

This Summary provides an illustrative context for aspects of the invention, in a simplified form. It is not intended to be used to determine the scope of the claimed subject matter. Aspects of the invention are described more fully below in the Detailed Description.

Described herein are systems and methods for handling a transition of a roaming mobile user device (i.e., a roaming client) from one access point (AP) to a target AP, referred to herein as soft inter-AP handoff. This technique involves a second mobile user device that is already connected with the target AP, called a roaming coordinator, assisting in handoff coordination between the APs. This coordination includes assisting the roaming client in establishing a client-to-client connection to relay data traffic during the handoff, while the roaming client establishes a connection with the target AP using traditional techniques. Soft inter-AP handoff allows a faster hand-off between APs than traditional techniques, and may reduce jitter in communications with the roaming device during the transition.

Aspects of the invention described herein include, but are not limited to: discovery of one or more roaming coordinator(s) by a roaming client; a key exchange algorithm performed between a roaming client and one or more potential roaming coordinators; selecting a roaming coordinator; establishing a client-to-client connection between the roaming coordinator and the roaming device; terminating the connection; a Layer 2/Layer 3 (L2/L3) interface residing on a roaming coordinator for interfacing L2/L3 communications between a roaming device and an AP; other aspects; and any suitable combination of the foregoing.

Aspects of roaming coordinator discovery can be performed in both Layer 2 (of the OSI model, i.e., the data link layer) and higher layer protocols by the roaming coordinator and the roaming client. The discovery information can be propagated across different wireless network boundaries, so that techniques described herein not only help a client roam within the same wireless network (i.e., between APs of a same network—BSSID roaming), but also across different wireless networks (SSID roaming).

In some embodiments, client-to-client key exchange is performed as part of the soft Inter-AP handoff, which may ensure that an equal or higher level of security is enforced when management and data traffic is exchanged. An existing secure L2 connection may be used to prevent a man-in-middle attack and help authenticate peers. All interim data traffic (i.e., data exchanged during the transition) passing through the client-to-client connection may be encrypted with the key negotiated during the key exchange.

In an embodiment of the invention, a roaming mobile user device transitions from a first wireless access point to a second wireless access point. During the transition, communications with the second wireless access point are transmitted and received through a second mobile user device in physical proximity to the roaming mobile user device.

In another embodiment of the invention, a system is provided for transitioning a roaming mobile user device from a first wireless access point to a second wireless access point. The system includes a transition module to transmit and receive, during the transition, communications with the second wireless access point through a second mobile user device in physical proximity to the roaming mobile user device.

In yet another embodiment of the invention, a computer program product is provided, which includes a computer-readable medium and computer-readable signals stored on the computer-readable medium. The computer-readable signals define instructions that, as a result of being executed by a computer, control the computer to perform a method of a roaming mobile user device transitioning from a first wireless access point to a second wireless access point. The method includes, during the transition, transmitting and receiving communications with the second wireless access point through a second mobile user device in physical proximity to the roaming mobile user device.

In another embodiment of the invention, a mobile user device discovers one or more candidates to serve as a roaming coordinator for a transition of the mobile user device from a first wireless access point to a second wireless access point. One or more discovery requests are transmitted across one or more wireless networks, each discovery request requesting candidates to serve as a roaming coordinator.

In another embodiment of the invention, a system is provided for a mobile user device to discover one or more candidates to serve as a roaming coordinator for a transition of the mobile user device from a first wireless access point to a second wireless access point. The system includes a discovery module to transmit one or more discovery requests across one or more wireless networks, each discovery request requesting candidates to serve as a roaming coordinator.

In yet another embodiment of the invention, computer program product is provided, which includes a computer-readable medium and computer-readable signals stored on the computer-readable medium. The computer-readable signals define instructions that, as a result of being executed by a computer, control the computer to perform a method of a mobile user device discovering one or more to serve as a roaming coordinator for a transition of the mobile user device from a first wireless access point to a second wireless access point. The method includes an act of transmitting one or more discovery requests across one or more wireless networks, each discovery request requesting candidates to serve as a roaming coordinator.

In another embodiment of the invention, a client-to-client connection between a roaming mobile user device and a second mobile user device is established, which will serve as a roaming coordinator to coordinate an exchange of data between the roaming mobile user device and a first wireless access point. The second mobile user device is selected from a candidate list listing one or more mobile user devices that are candidates to serve as the roaming coordinator.

In another embodiment of the invention, a system is provided for establishing a client-to-client connection between a roaming mobile user device and a second mobile user device that will serve as a roaming coordinator to coordinate an exchange of data between the roaming mobile user device and a first wireless access point. The system includes a transition module to select the second mobile user device from a candidate list listing one or more mobile user devices that are candidates to serve as the roaming coordinator.

In yet another embodiment of the invention, a computer program product, which includes a computer-readable medium and computer-readable signals stored on the computer-readable medium. The signals define instructions that, as a result of being executed by a computer, control the computer to perform a method of establishing a client-to-client connection between a roaming mobile user device and a second mobile user device that will serve as a roaming coordinator to coordinate an exchange of data between the roaming mobile user device and a first wireless access point. The method includes an act of selecting the second mobile user device from a candidate list listing one or more mobile user devices that are candidates to serve as the roaming coordinator.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIG. 10 is a table illustrating an example of address changes to fields in a MAC header resulting from a roaming coordinator receiving a data packet from a roaming client, according to some embodiments of the invention;

FIG. 11 is a table illustrating an example of address changes to fields in a MAC header resulting from the roaming coordinator receiving a data packet from an access point through an infrastructure connection, according to some embodiments of the invention;

FIG. 12 is a table illustrating an example of address changes to fields in a MAC header resulting from the roaming coordinator processing a packet generated from its upper layer components, according to some embodiments of the invention;

FIG. 13 is a table illustrating an example of address changes to fields in a MAC header resulting from the roaming coordinator processing a packet generated from its upper layer components, according to some embodiments of the invention;

DETAILED DESCRIPTION

Although embodiments of the invention are described below primarily in relation to IEEE 802.11 networks, it should be appreciated that the invention is not so limited. Embodiments of the invention may be implemented using other types of wireless networks and technologies such as, for example, Ultra-Wideband (UWB) technology.

The function and advantages of embodiments of the present invention described above and other embodiments will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

Figure 1:
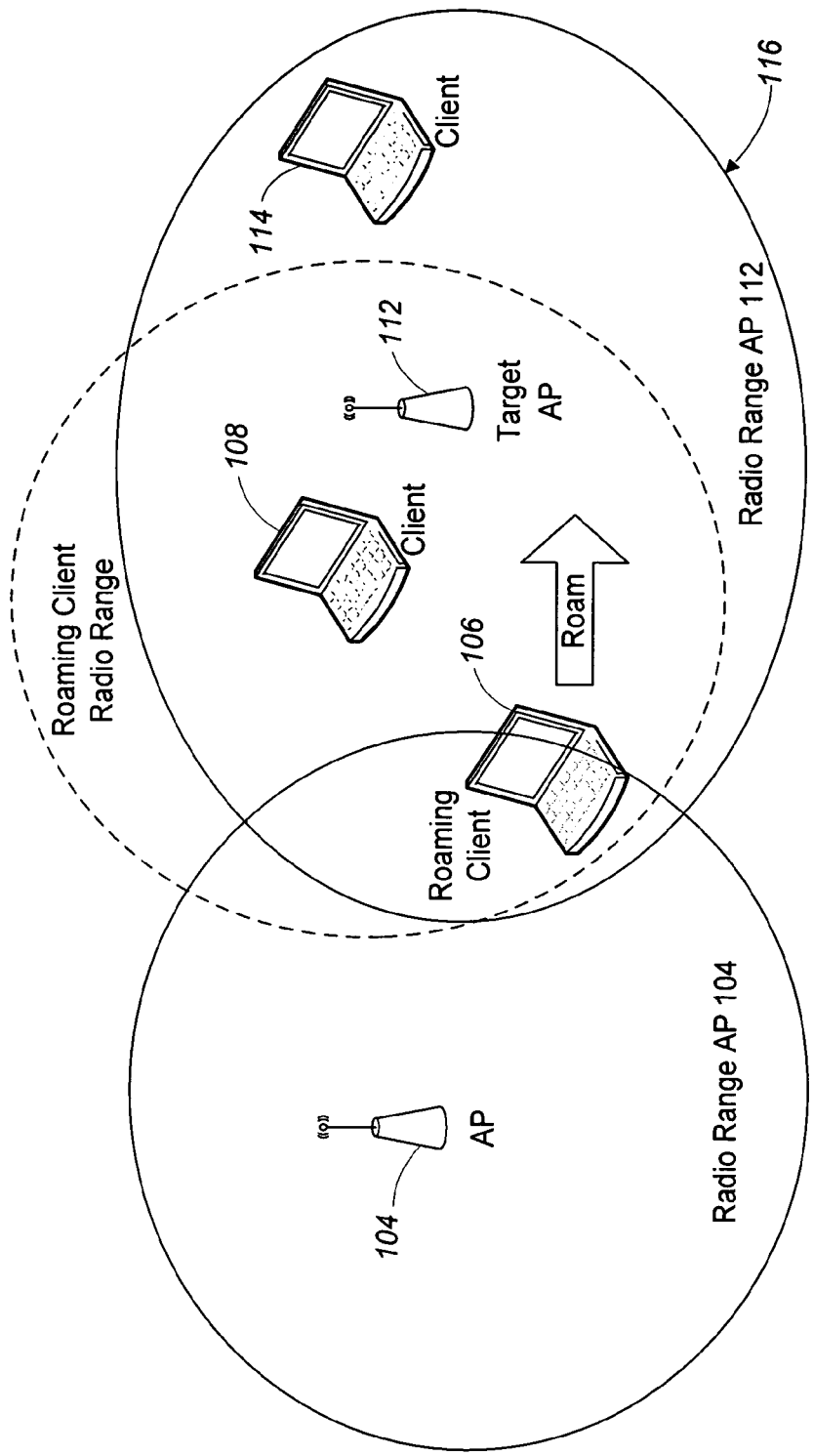
FIG. 1 is a block diagram illustrating an example of a roaming client transitioning between APs, according to some embodiments of the invention.

FIG. 1 is a block diagram illustrating an example of a roaming client 106 transitioning between APs 104 and 112, according to some embodiments of the invention. FIG. 1 provides a context for several aspects of the invention, and is referenced below.

AP 104 and AP 112 are APs that may be part of, and assist in providing, 802.11 infrastructure networks and/or other types of wireless networks. These APs may belong to a same wireless network and thus advertise the same service set ID (SSID), or may belong to different wireless networks and thus advertise different SSIDs. In addition, they may operate on a same or different channel and/or frequency.

Each AP may have any number of clients (i.e., mobile user devices) connected to it. Roaming client 106 may be configured to roam from one AP to another based on its internal state changes or network environmental changes. When roaming client 106 roams into range 116 of target AP 112, it may be capable of communicating with AP 112 and one or more clients (e.g., 108) in physical proximity to roaming client 106.

Client 108 may serve as a roaming coordinator for roaming client 106 during its transition from AP 104 to target AP 112. Client 108 may meet at least minimal requirements of a roaming coordinator, for example, being connected to the target AP 112 and being physically proximate to roaming client 106. Further, client 108 may be capable of performing pre-connection key negotiation with a roaming client, establishing a secure client-to-client connection with a roaming client and relaying data traffic between a roaming client and a target AP.

Any of client devices 106, 108 and 114 may be implemented as a mobile user device 200 described below in detail in relation to FIG. 2, and may be configured to be capable of serving as a roaming client and/or roaming coordinator, including a roaming coordinator such as roaming coordinator 900, which includes a Layer 2.5 routing engine 904.

Figure 2:
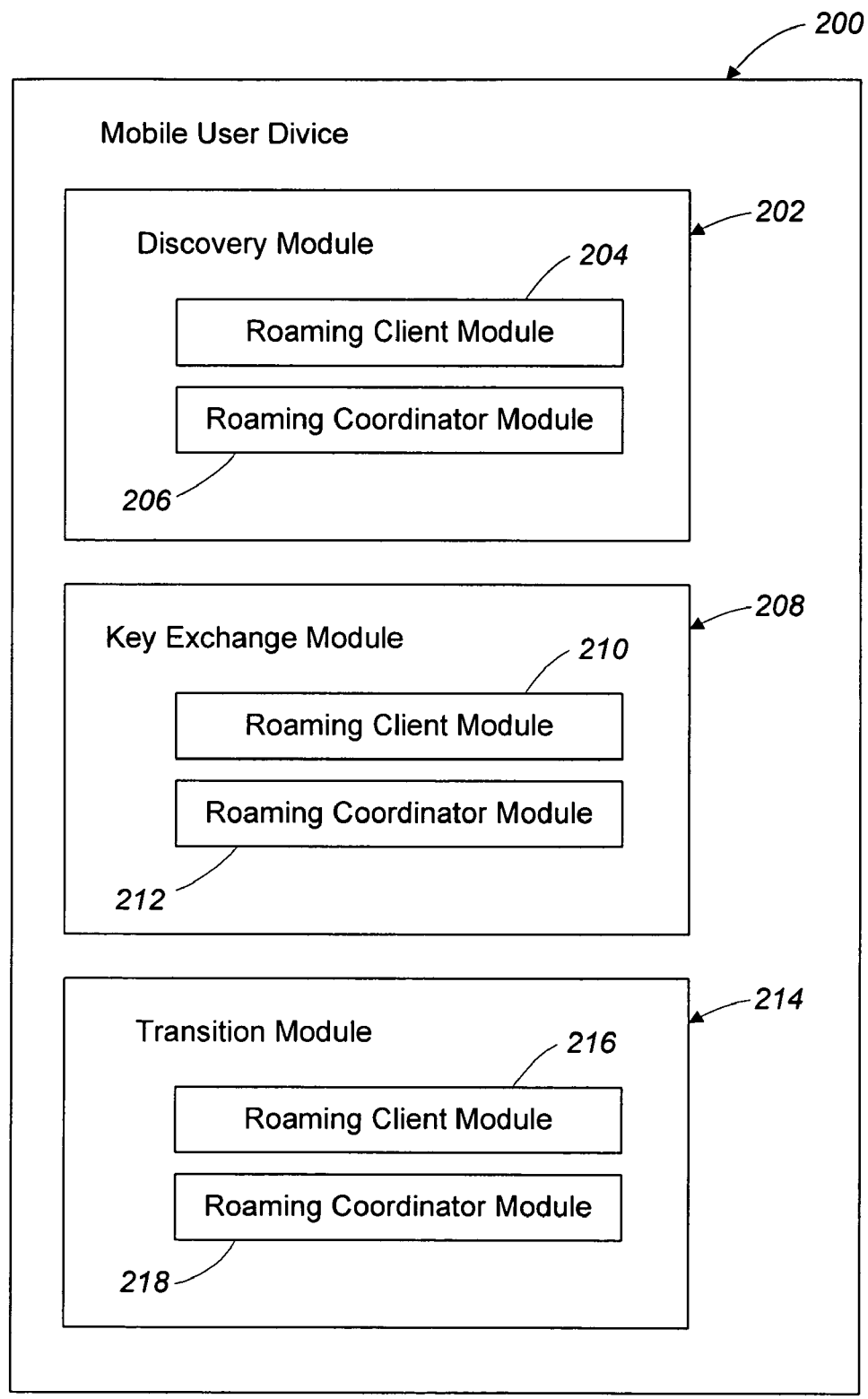
FIG. 2 is a block diagram illustrating an example of a mobile user device operative to perform soft inter-AP handoff, according to some embodiments of the invention.

FIG. 2 is a block diagram illustrating an example of a mobile user device 200 operative to perform one or more aspects of soft inter-AP handoff, according to some embodiments of the invention. System 200 is merely an illustrative embodiment of a mobile user device operative to perform one ore more aspects of soft inter-AP handoff, and is not intended to limit the scope of the invention. Any of numerous other implementations of such a system, for example, variations of system 200, are possible and are intended to fall within the scope of the invention.

Mobile user device 200 may include any of: discovery module 202; key exchange module 208; transition module 214; other components; and any suitable combination of the foregoing. Discovery module 202 may be configured to perform one or more operations as part of a roaming client discovering one or more roaming coordinator candidates, for example, as described below in relation to FIG. 4. Discovery module may include any of: roaming client module 204; roaming coordinator module 206; other components; and any suitable combination of the foregoing. Roaming client module 204 may be configured to perform one or more operations of a roaming client as part of a discovery of one or more roaming coordinator candidates, for example, as described below in relation to FIG. 4. Roaming coordinator module 206 may be configured to perform one or more operations of a roaming coordinator candidate as part of a roaming client discovering one or more roaming coordinator candidates, for example, as described below in relation to FIG. 4. Thus modules 204 and 206 enable a mobile user device 204 to serve a role as a roaming client or a roaming coordinator during the discovery of one or more roaming coordinator candidates.

Key exchange module 208 may be configured to perform one or more operations as part of negotiating a key exchange between a roaming client and one or more roaming coordinator candidates, for example, as described below in relation to FIG. 5. Module 208 may include any of: roaming client module 210; roaming coordinator module 212; other components; or any suitable combination of the foregoing. Roaming client module 210 may be configured to perform one or more operations as a roaming client negotiating a key exchange with one or more roaming coordinator candidates, for example, as described below in relation to FIG. 5. Roaming coordinator module 212 may be configured to perform one or more operations as a roaming coordinator negotiating a key exchange with a roaming client, for example, as described below in more detail in relation to FIG. 5. Thus, modules 210 and 212 of key exchange module 208 enable mobile user device 200 to serve a role as a roaming client or a roaming coordinator as part of a key exchange between a roaming client and a roaming coordinator.

Transition module 214 may be configured to perform one or more operations of a soft inter-AP handoff during the transition of the roaming client between APs, for example, as described below in more detail in relation to Acts 308-320 of method 300. Module 214 may include any of: roaming client module 216; roaming coordinator module 218; other components; or any suitable combination of the foregoing. Roaming client module 216 may be configured to perform one or more operations as a roaming client as part of a soft inter-AP handoff, for example, as described below in more detail in relation to Acts 308-320. Roaming coordinator module 218 may be configured to perform one or more operations as a roaming coordinator as part of a soft inter-AP handoff, for example, as described below in more detail in relation to Acts 308-320. Thus, modules 216 and 218 enable mobile user device 200 to act as a roaming client or roaming coordinator during a soft inter-AP handoff.

Figure 9:
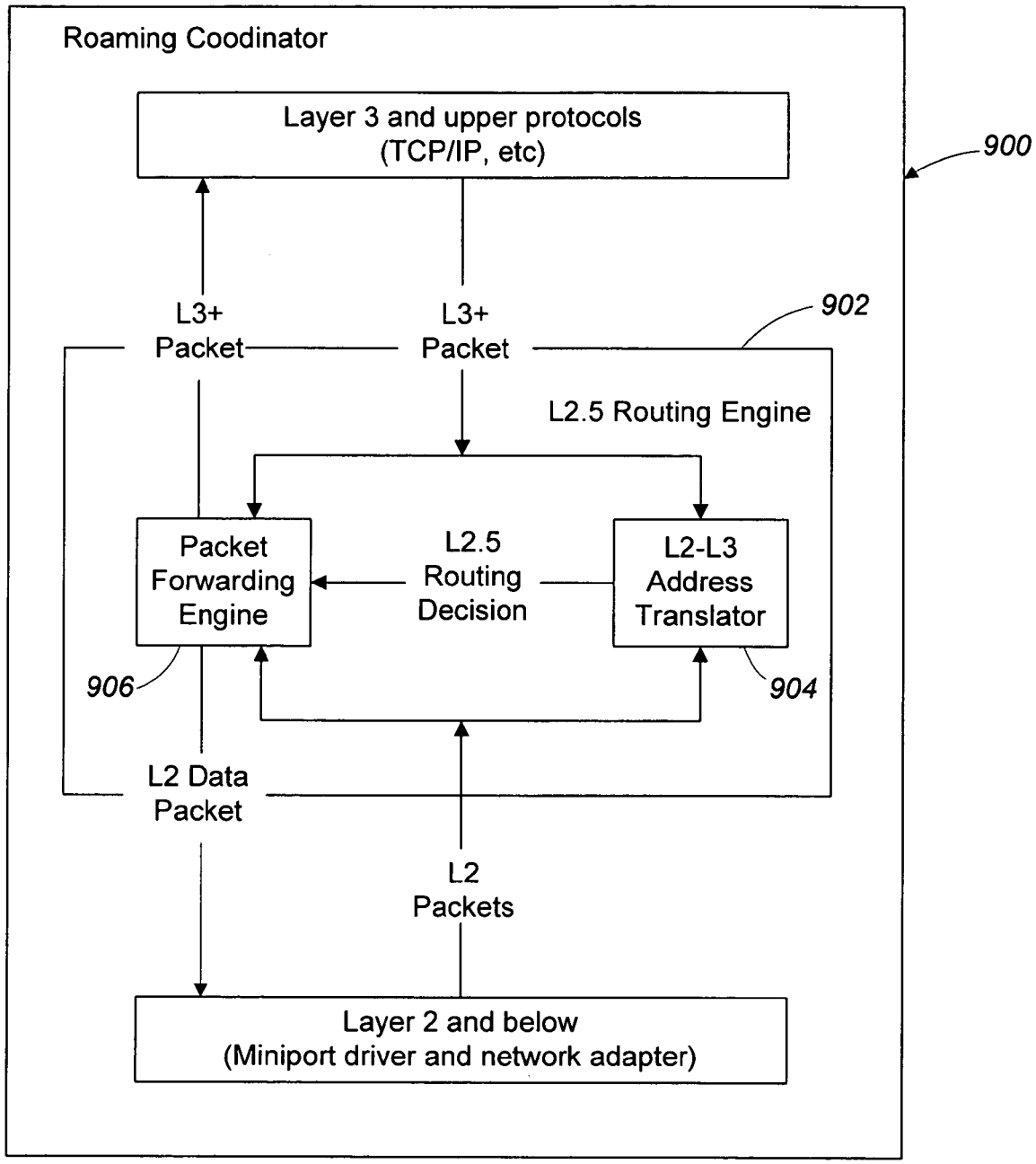
FIG. 9 is a block diagram illustrating an example of a routing coordinator comprising a Layer 2.5 routing engine, according to some embodiments of the invention.

Mobile user device 200 also may include one or more components of roaming coordinator 900 described below in relation to FIG. 9, including Layer 2.5 routing engine 902 which may, for example, be part of transition module 214.

Mobile user device 200, and components thereof may be implemented using any of a variety of technologies, including software (e.g., C, C#, C++, Java, J# or a combination thereof), hardware (e.g., one or more application-specific integrated circuits), firmware (e.g., electrically-programmed memory) or any combination thereof. Further, each of the components of device 200 may reside in one or more locations on the device 200. For example, different portions of the components may reside in different areas of memory (e.g., RAM, ROM, disc, etc.) on the device 200. Device 200 may include, among other components, a plurality of known components such as one or more processors, a memory system, a disc storage system, one or more network interfaces, and one or more busses or other internal communication links interconnecting the various components. Device 200, and components thereof, may be implemented using a computer system such as that described below in relations to FIGS. 14 and 15.

Figure 3:
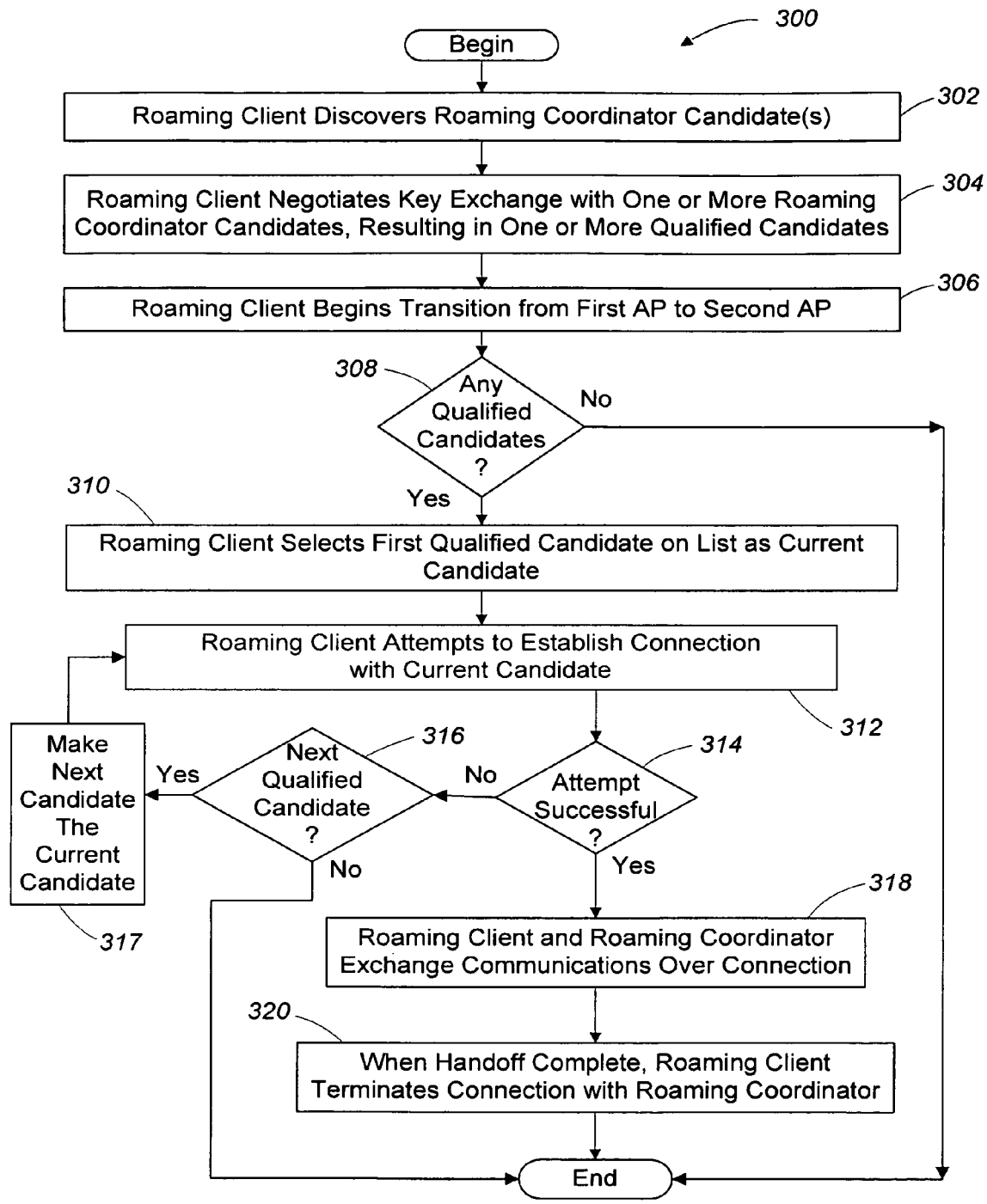
FIG. 3 is a flow chart illustrating an example of a method of performing a soft inter-AP handoff between a roaming client and roaming coordinator, according to some embodiments of the invention.

FIG. 3 is a flow chart illustrating an example of a method 300 of performing a soft inter-AP handoff between a roaming client (e.g., 106 and/or 200) and roaming coordinator (e.g., 106 and/or 200), according to some embodiments of the invention. Method 300 is merely an illustrative embodiment of a method of performing a soft inter-AP handoff, and is not intended to limit the scope of the invention. Other implementations, for example, variations of method 300, are possible and are intended to fall within the scope of the invention.

In Act 302, a roaming client may discover one or more roaming coordinator candidates, for example, as described below in relation to method 400 illustrated in FIG. 4.

Figure 4:
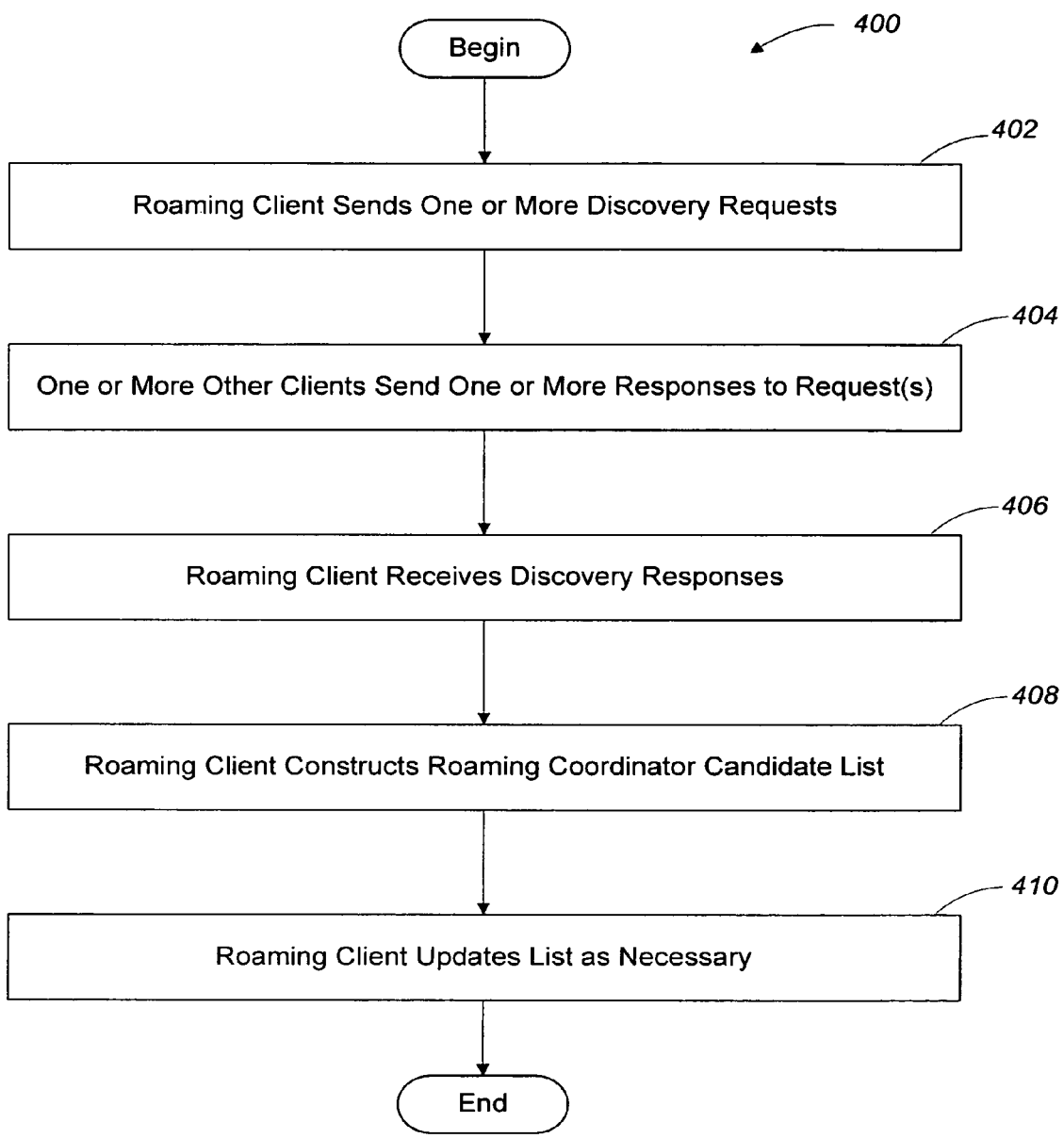
FIG. 4 is a flow chart illustrating an example of a method of a roaming client discovering one or more roaming coordinator candidates, according to some embodiments of the invention.

Digressing briefly from FIG. 3, FIG. 4 is a flow chart illustrating an example of a method 400 of a roaming client discovering one or more roaming coordinator candidates, according to some embodiments of the invention. Method 400 is merely an illustrative embodiment of a method of a roaming client discovering one or more roaming coordinator candidates, and is not intended to limit the scope of the invention. Other implementations, for example, variations of method 400, are possible and are intended to fall within the scope of the invention.

In Act 402, a roaming client sends one or more discovery requests across one or more wireless networks. For example, before a roaming client attempts to transition to a target AP, it may first search for one or more roaming coordinator candidates that are connected to the target AP. Any of a variety of discovery algorithms may be used to perform this searching, for example, by utilizing existing network connectivity or out-of-band channels. For example, searching for one or more roaming coordinators may be performed using any of the following techniques or any suitable combination thereof:

1) client performs Universal Plug and Play (UPnP) discovery over existing network connectivity;
2) client generates power-save packet (PS) to its original AP and switches to the channel that the target AP is operating on, and then performs proximity service discovery for coordinating service running on a roaming coordinator; and
3) client performs Layer 2 broadcasting over wireless network to search for roaming coordinators (applicable if the target AP is within the same subnet).

A roaming client performing the task of roaming coordinator discovery may include one or more (e.g., all) of the following information in its discovery requests, one or more of which may be mandatory:

1) the target AP's Basic Service Set ID (BSSID) and SSID;
2) a list of methods for supported key exchange(s) for establishing client-to-client connectivity and encryption for data transmission/reception; and
3) supported rate set (i.e., a rate set supported by the roaming client).

In Act 404, one or more other clients (i.e., clients other than the roaming client) may send one or more responses to the roaming client in response to the one or more discovery requests. A client that responds to a roaming coordinator discovery request is often referred to herein as a "potential roaming coordinator". In some embodiments, a potential roaming coordinator only responds to a discovery request when one or more (e.g., all) of the following conditions are met:

1) the potential roaming coordinator is connected with the target AP and has full access to the network that the target AP provides;
2) the potential roaming coordinator is able to provide a key exchange method that is compatible with the one or more key exchange methods specified in the roaming client's discovery request; and
3) the potential roaming coordinator is able to provide a new client-to-client (C2C) channel for a secure client-to-client connection with the roaming client; and
4) it can apply an encryption/decryption method that is compatible with the one in the roaming client's discovery request.

In some embodiments, a potential roaming coordinator replies with a unicast discovery response message to the roaming client, which may include one or more (e.g., all) of the following pieces of information, one or more of which may be mandatory:

1) a BSSID for the client-to-client connectivity;
2) a key exchange method and encryption method to be used for the client-to-client connectivity with the target AP (the candidate roaming coordinator may be required to select an encryption method that has equal or higher security level than the one used in its current connection);
3) a supported rate set of potential roaming coordinator; and
4) proximity information (e.g., target AP's signal strength, and signal quality that the station can receive, etc).

In Act 406, the roaming client may receive one or more discovery responses. For example, the roaming client may collect discovery responses sent by the one or more potential roaming coordinators.

In Act 408, the roaming client may construct a roaming coordinator candidate list. As used herein a "roaming coordinator candidate" is a potential roaming coordinator who has been added to a candidate list of a roaming client. For example, if the roaming client receives discovery responses from one or more potential roaming coordinators connected to the target AP, the client may sort the roaming coordinator candidate list according to one or more criteria, e.g., one or more of the following criteria:
1) candidates that receive stronger signal strength and better signal quality with the target AP are given higher priority;
2) candidates that use stronger key exchange and encryption methods are given a higher priority; and
3) candidates that support higher data rates are given a higher priority.

In some embodiments, the roaming client may keep records (e.g., entries in the candidate list) of all roaming coordinator candidates up to a pre-defined maximum number. Further, in Act 410, the roaming client may update the candidate list as necessary. For example, the roaming client may discard records of roaming coordinator candidates from the list when one or more of the following conditions are met:
1) a transition between APs succeeds or fails;
2) a new list of roaming coordinators is constructed as a result of a later coordinator discovery operation; and
3) the roaming client is disconnected, reset or shutdown by the user or other management entities.

In some embodiments, the roaming client may perform discovery on multiple target APs, and maintain a separate roaming coordinator candidate list for each target AP.

If the roaming client does not find any roaming coordinator candidate for the target AP, it is not able to perform soft inter-AP handoff. In this case, the roaming client does not perform any of the subsequent operations described below. Rather, the roaming client may perform traditional handoff techniques.

Method 400 may include additional acts. Further, the order of the acts performed as part of method 400 is not limited to the order illustrated in FIG. 4, as the acts may be performed in other orders and/or one or more of the acts may be performed in parallel, at least partially. For example, any of Acts 406-410 may be performed for a given discovery response before and/or during the sending of another discovery response in Act 404.

Returning to method 300, in Act 304, a roaming client may negotiate a key exchange with one or more roaming coordinator candidates, which may result in one or more qualified candidates. The purpose of such a client-to-client data key exchange may be to negotiate data encryption/decryption session key(s) for client-to-client connectivity between a roaming client and a roaming coordinator. Act 304 may be performed as described below in relation to method 500 illustrated in FIG. 5.

Figure 5:
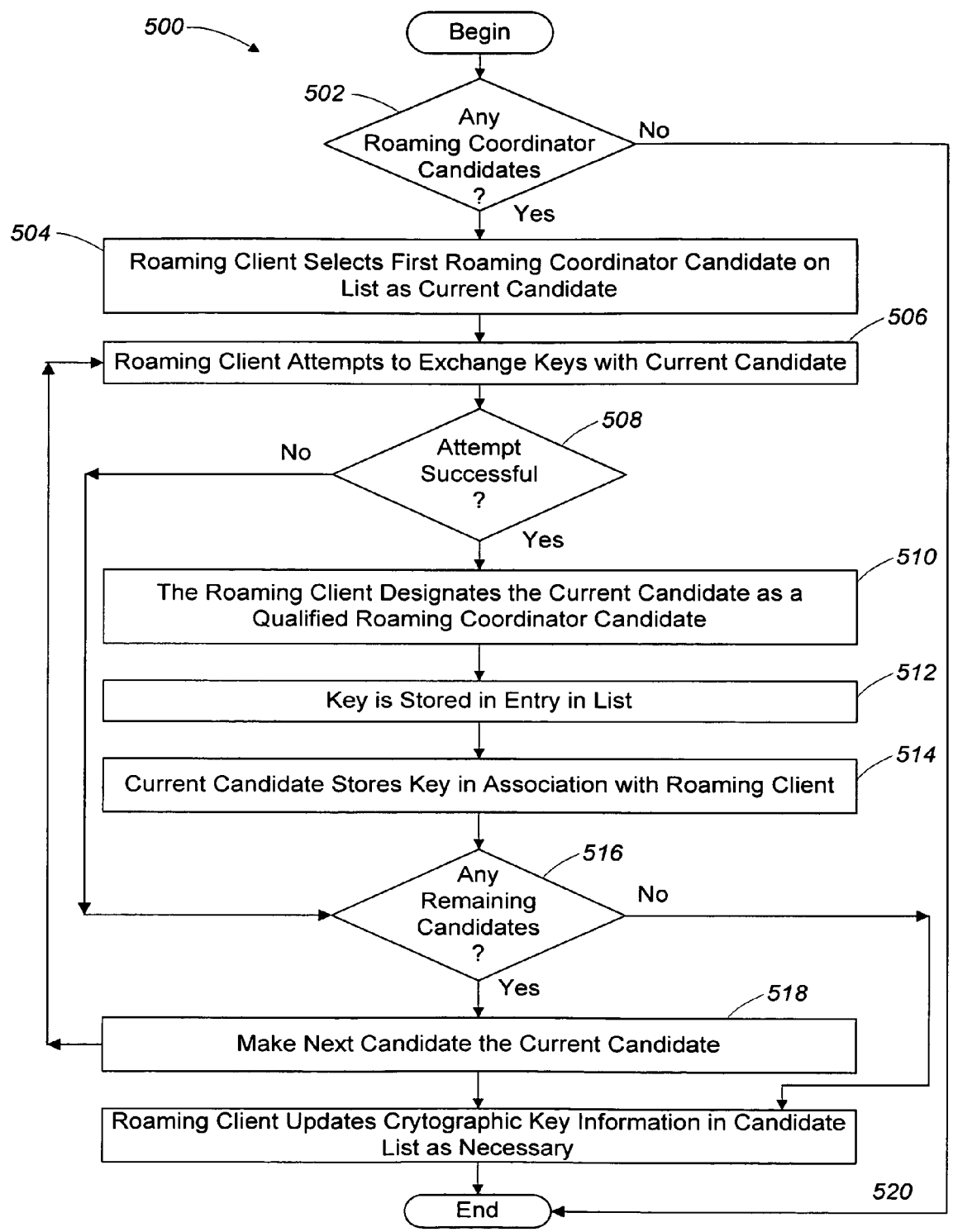
FIG. 5 is a flow chart illustrating an example of a method of a roaming client negotiating a key exchange with one or more roaming coordinator candidates, according to some embodiments of the invention.

Digressing briefly again from FIG. 3, FIG. 5 is a flow chart illustrating an example of a method 500 of a roaming client negotiating a key exchange with one or more roaming coordinator candidates, according to some embodiments of the invention. Method 500 is merely an illustrative embodiment of a method of a roaming client negotiating a key exchange with one or more roaming coordinator candidates, and is not intended to limit the scope of the invention. Other implementations, for example, variations of method 500, are possible and are intended to fall within the scope of the invention.

In Act 502, it may be determined whether there are any roaming coordinator candidates in the candidate list for the target AP, which may have been generated as part of Act 302. If there are no such candidates in the list, then method 500 may end. Otherwise, the roaming client may select a first roaming coordinator candidate on the list as a current candidate. As described above, the roaming coordinator candidate list may be prioritized according to one or more criteria. Act 504 may select the roaming coordinator candidate that has the highest priority on the list.

In Act 506, the roaming client may attempt to exchange keys with the current candidate. The roaming client may initiate the key exchange process, which may occur at layer 2 or a higher layer, such as, for example, at a Transmission Control Protocol (TCP) or User Datagram Protocol (UDP) layer.

In some embodiments, the roaming client and roaming coordinator candidate use the existing Layer 2 data channel to transmit/receive key exchange traffic. The purpose for doing so would be to identify any peer as an authenticated member in its wireless network, and to avoid a man-in-middle attack during the key exchange process. The roaming client should use the key exchange method that was negotiated during roaming coordinator discovery (e.g., method 400).

In Act 508, it may be determined whether the attempt to exchange keys was successful. For example, the roaming coordinator candidate may discover that the key exchange method that the roaming client is using is not supported or configured for the roaming coordinator, and the roaming coordinator may drop the key exchange packet and stop the key exchange process immediately. In this case, the attempt is not successful, and the current roaming coordinator candidate is not designated as a qualified roaming coordinator candidate. Method 500 then may proceed to Act 516 in which it is determined whether there are any remaining candidates in the roaming coordinator candidate list.

If, in an Act 508, the attempt to exchange keys is successful, then the roaming client may designate the current candidate as a qualified roaming coordinator candidate in Act 510, and store the key negotiated with the candidate in a list, for example, the roaming coordinator candidate list. Further, in Act 514, the current roaming coordinator candidate, now qualified, may store the negotiated key in a manner that associates it with the roaming client. For example, the current candidate may maintain a list of roaming clients with which it has negotiated keys and can serve as a roaming coordinator. A roaming coordinator may be configured such that, before it becomes a qualified roaming coordinator for a roaming device, it does not keep any information about the roaming client.

At this stage of method 500, the roaming client and the coordinator have an agreement on both connectivity and security settings to be used for client-to-client connections. Thus, in effect, a virtual connection has been established.

In Act 516, it may be determined whether there are any remaining candidates, for example, in the candidate list. If so, the next candidate (e.g., the candidate with the next highest priority in the roaming coordinator candidate list) may be made the current candidate, and Acts 508-518 may be repeated. Thus, Acts 508-518 may involve looping through all roaming coordinator candidates on the candidate list, although in some embodiments the number of candidates for which Acts 508-518 is performed may be limited to a predefined number.

In Act 520, the roaming client may update negotiated key information in the candidate list as necessary. For example, the roaming client may discard a candidate entry for a qualified roaming coordinator candidate when one or more of the following occurs:

1) the roaming coordinator candidate record is discarded; or
2) a new key is acquired for the qualified coordinator candidate as a result of a later negotiated key exchange (in such a case, the roaming client may replace the old key with the new key).

The roaming client and roaming coordinator candidate can choose to use either a public or proprietary key exchange method, such as key exchange protocols based on a Diffie-Hellman key agreement. In embodiments in which all packets are transmitted on an existing L2 data channel and secured with an existing L2 data key, the security level of the key exchange may be equivalent to or higher than the security level of existing L2 data traffic between the roaming client and the roaming coordinator candidate.

For each transition to a new target AP, the roaming client may perform one or more such key exchanges with different roaming coordinate candidates depending on any of a variety of factors, such as, for example, network situation, roaming client's configuration, transition timing requirements and/or other factors.

In order to reduce the risk of a denial-of-service attack, a roaming coordinator may apply an aggressive time-out algorithm to clean up stale information of roaming clients and keys (for example, every few seconds). Internally, the roaming coordinator may be configured to support a certain number of roaming clients simultaneously and not respond to any coordinator discovery requests if the required threshold is reached.

As noted above, a roaming client may perform discovery for multiple target APs. Accordingly, method 500 may be performed for each target AP for which discovery was performed. For example, Acts 502-520 may be performed separately for each AP-specific, roaming coordinator candidate list.

Method 500 may include additional acts. Further, the order of the acts performed as part of method 500 is not limited to the order illustrated in FIG. 5, as the acts may be performed in other orders and/or one or more of the acts may be performed in parallel, at least partially. For example, one or more acts of method 500 may be performed in parallel for key exchanges performed concurrently between the roaming client and two or more different roaming coordinator candidates.

Returning to method 300, in Act 306, the roaming client may begin its transition from a first AP to a second AP (i.e., the target AP). In Act 308, the roaming client may search its roaming coordinator candidate list for the target AP, and determine if there are any qualified candidates on the list (i.e., candidates for which it has negotiated a key to establish a client-to-client connection).

As noted above, entries on a roaming coordinator candidate list for a target AP may be prioritized according to one or more criteria. Act 310 may involve the roaming client selecting as a current candidate the qualified candidate on the list that has a highest priority.

In Act 312, the roaming client attempts to establish a connection with the current candidate. Thus, before (or concurrently to when) the roaming client starts costly handoff operations with the target AP such as, for example, IEEE 802.11 association, L2 authentication and/or key exchanges, the roaming client can establish a temporary client-to-client connection with one of the qualified roaming coordinator candidates. Because the roaming client and the current candidate already negotiated connectivity and security settings during the roaming coordinator discovery and key-exchange phases before the transition to the target AP, a secure client-to-client connection is almost set up and ready for use, as long as the roaming client and roaming coordinator can transmit traffic to and receive traffic from their peers.

As part of attempting to establish a connection, the roaming client may test the connectivity by transmitting a normal NULL data packet and waiting for an acknowledgement (ACK) packet from the roaming coordinator. This data packet may be configured to use the connectivity and security settings described above.

In Act 314, it may be determined whether the attempt to establish a connection with the current candidate was successful. For example, based on the IEEE 802.11 standard, an ACK packet should be replied within a few milliseconds of transmitting the NULL packet. If the roaming client does not receive an ACK packet within this time, then it may determine that the attempt to establish the connection has failed. Otherwise, it may determine that the attempt was successful. The attempt may have failed because the coordinator was too far away and not reachable, or for any of a variety of other reasons. If Act 314 determines that the attempt to establish a connection was not successful, then, in Act 316, it may be determined whether there is a next qualified candidate, for example, in the roaming coordinator candidate list for the target AP. If not, then the method 300 may end. Otherwise, the next candidate from the list may be made a current candidate in Act 317, and method 300 may proceed to Act 312.

If the attempt to establish a connection is determined to be successful in Act 314, then the roaming client and the roaming coordinator may exchange communication packets over the established connection in Act 318. For example, these packets may be transmitted and received as L2 data packets using the data key negotiated between the roaming client and the roaming coordinator. In parallel to the performance of one or more of Acts 306-318, the roaming client may initiate a handing off between the old AP and the target AP using known handoff techniques. Absent the ability to perform a soft inter-AP handoff, the roaming client would have to queue L2 data packets during the interim between the initiation of the handoff and its completion.

The roaming coordinator may use a time-out algorithm to clean up stale client-to-client connections, roaming client information and keys. If there is no traffic in the client-to-client connection for a certain amount of time (e.g., a few seconds), the roaming coordinator may terminate the client-to-client connection, and remove the record of the roaming client and its client-to-client key.

After a client-to-client data key has been negotiated successfully (e.g., as described above in relation to FIG. 5), the roaming coordinator should expect incoming packets from the roaming client at any time. The coordinator may be configured to only accept client-to-client data packets from clients with which it has already established a client-to-client connection. The roaming coordinator may be configured to use the roaming client's BSSID to perform filtering.

In some embodiments, the roaming client and roaming coordinator may perform one or more (e.g., all) of the following operations (e.g., in sequence) to enable a packet relay. If the roaming client is operating on a different channel/frequency, it may switch to the channel/frequency on which the target AP and roaming coordinator operate. The roaming client may first send out a Roaming Notification Packet (RNP) to the roaming coordinator. The RNP may include the following information: a) IPv4 addresses on the roaming client if applicable; and b) IPv6 addresses on the roaming client if applicable. In some embodiments, RNP must contain at least one of the above pieces of information. Otherwise, the RNP may be treated as a corrupted one and discarded by the roaming coordinator.

Upon receiving RNP, the roaming coordinator may do the following:

a) create a list of entries in its Layout 2 (L2) address translator (described below), one for each IPv4 or IPv6 address, with Media Access Control (MAC) address to be the roaming client's MAC address;

b) for each IPv4 address, send out an ARP response packet to the AP with a broadcast destination address, declaring that the IPv4 address is associated with the coordinator's MAC address; and c) for each IPv6 address, send out a neighbor discovery packet to the AP with a broadcast destination address, declaring that the IPv6 address is associated with the coordinator's MAC address.

The coordinator may now be ready to relay L2 data packets for the roaming client during the remaining part of the transition to the target AP. The roaming client may continue its transition by establishing an association with the target AP and performing L2 authentication and key exchange as it would do using normal handoff techniques. At the same time, the roaming client may continue sending and receiving its wireless data traffic via the client-to-client connection with the roaming coordinator.

In Act 320, the roaming client may terminate the connection with roaming coordinator when the handoff between the old AP and the target AP is complete. For example, after the handoff between the old AP and the target AP is complete, the roaming client may break down the client-to-client connection immediately and close the pipe internally. Afterwards, incoming and outgoing data packets should go through the direct connection with the target AP.

Method 300 may include additional acts. Further, the order of the acts performed as part of method 300 is not limited to the order illustrated in FIG. 3, as the acts may be performed in other orders and/or one or more of the acts may be performed in parallel, at least partially.

After a roaming client starts to use a client-to-client connection with a roaming coordinator for data traffic, it can keep using the existing L2-L3 address mapping tables (e.g., Address Resolution Protocol (ARP) table for IPv4) which it constructed before the transition to the target AP began.

When the roaming client needs to resolve a station's MAC address, or a station needs to resolve the roaming client's address, they should follow the normal operation sequences defined by Layer 3 (L3) protocols for L2-L3 address resolution (e.g., ARP or IPv6 neighbor discovery protocol). At this time, the roaming coordinator may update the MAC header appropriately and perform packet forwarding.

Figure 6:
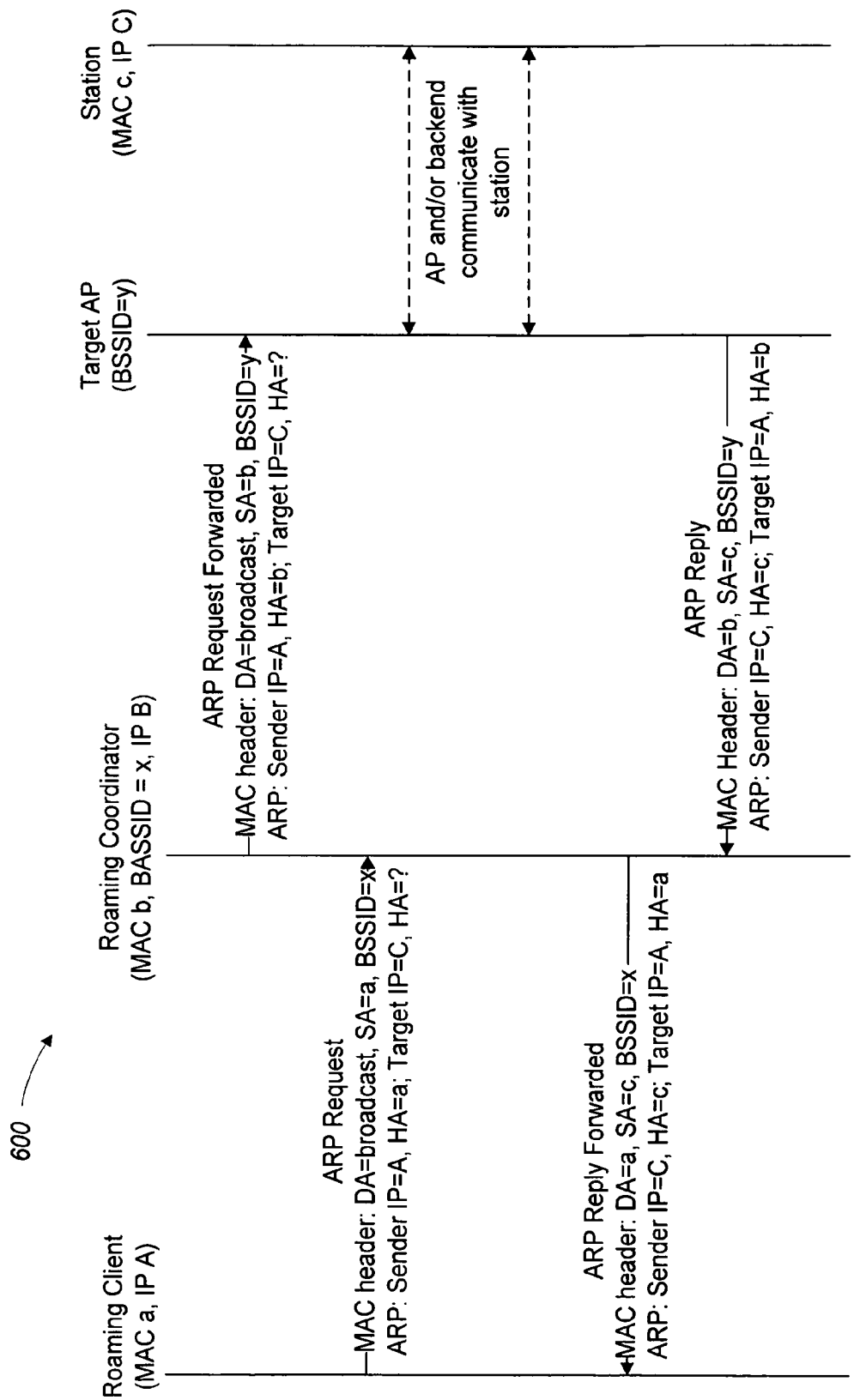
FIG. 6 is a timing diagram illustrating an example of a packet exchange sequence when a roaming client tries to resolve a station's address by using ARP, according to some embodiments of the invention.

FIG. 6 is a timing diagram 600 illustrating an example of a packet exchange sequence when a roaming client tries to resolve a station's address by using ARP, according to some embodiments of the invention. The packet may be forwarded by coordinator and transmitted through the target AP.

Figure 7:
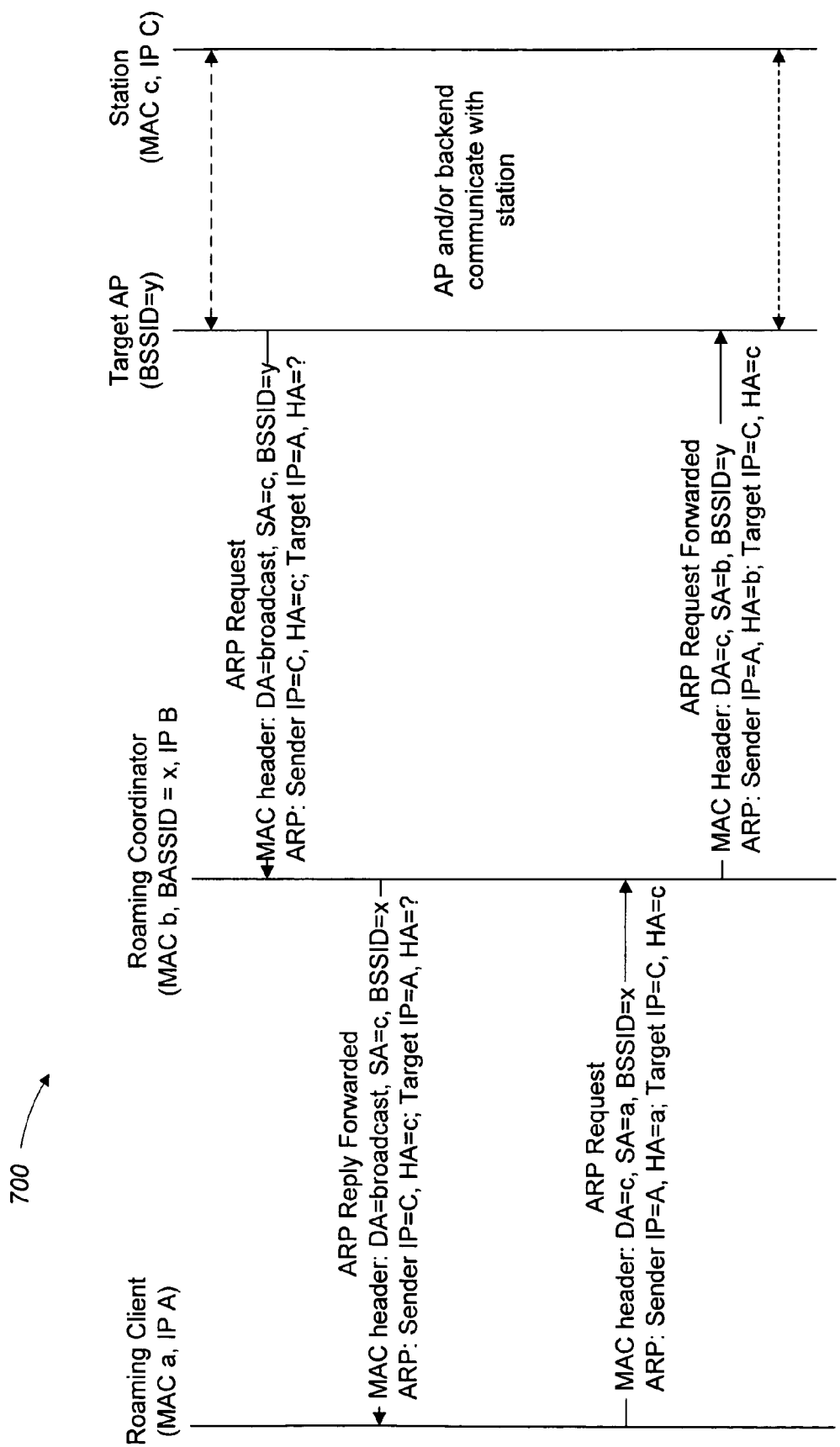
FIG. 7 is a timing diagram illustrating an example of a packet exchange sequence when a station tries to resolve a roaming client's address by using ARP, according to some embodiments of the invention.

FIG. 7 is a timing diagram 700 illustrating an example of a packet exchange sequence when a station tries to resolve a roaming client's address by using ARP, according to some embodiments of the invention. The packet may be transmitted through the target AP and forwarded by the coordinator.

After a roaming client completes a transition to a target AP and establishes an infrastructure connection with the target AP, it may keep using the existing L2-L3 address mapping tables (e.g., ARP table for IPv4), which it constructed before and during the transition.

The roaming coordinator may perform the same or a similar data exchange sequence as the sequence illustrated in timing diagrams 600 and/or 700 to cover at least the following types of packets for L2 address resolution: ARP; IPv6 Neighbor Discovery; IPv6 Router Discovery; IPv6 Redirects; and DHCPv4.

The roaming coordinator may use the client-to-client data keys (e.g., negotiated as described above in relation to FIG. 5) to perform encryption, decryption and message integrity check if applicable. On the other hand, the roaming coordinator may use normal session keys for data communication with the AP with which it is connected.

Figure 8:
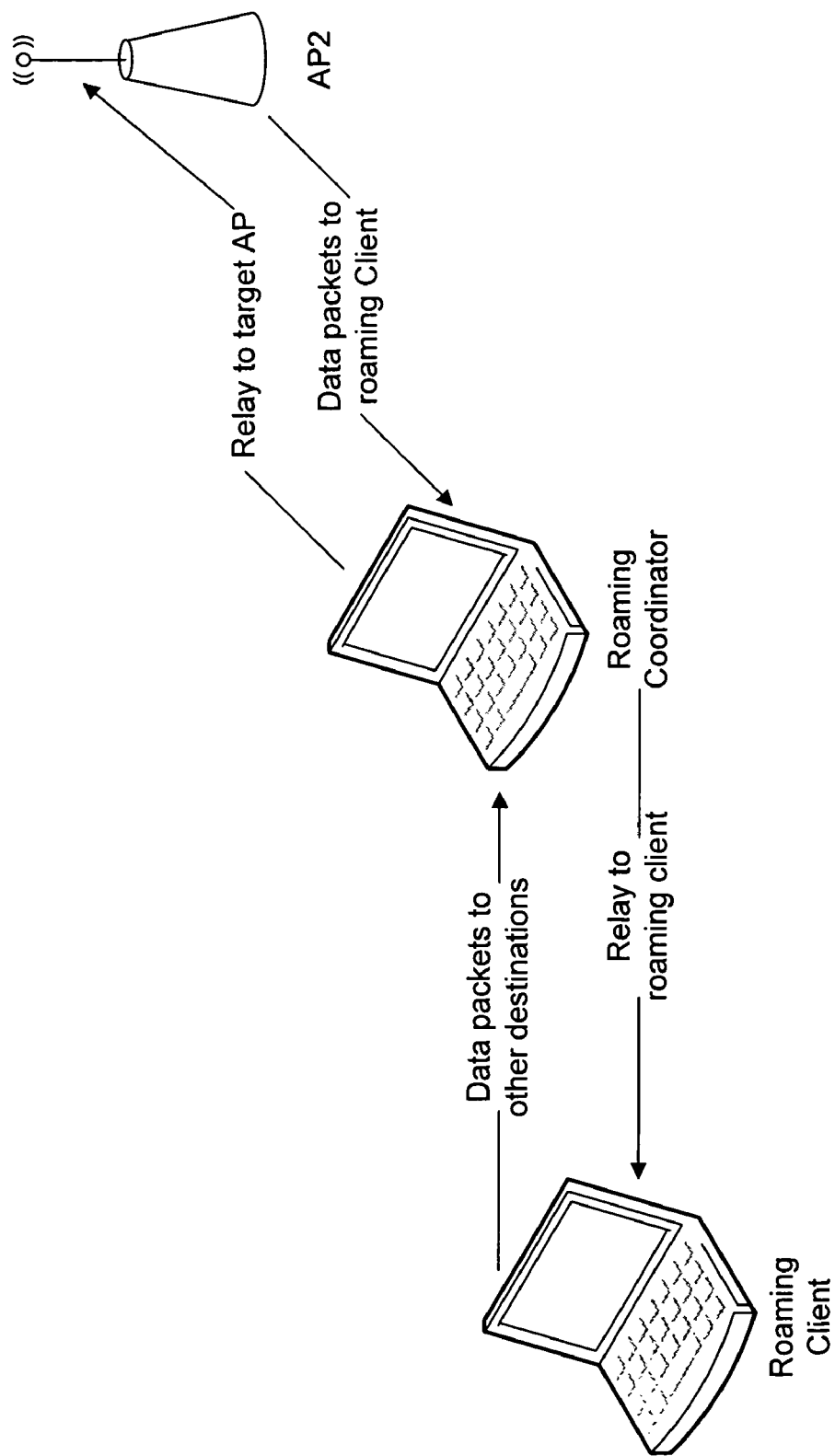
FIG. 8 is a block diagram illustrating an example of a Layer 2 packet relay performed by a roaming coordinator, according to some embodiments of the invention.

During the transition, the roaming client may not have a direct connection with the target AP, so the roaming coordinator may relay data traffic sourced from and destined to the roaming client. FIG. 8 is a block diagram illustrating an example of a L2 packet relay performed by a roaming coordinator, according to some embodiments of the invention.

In some embodiments, the roaming coordinator includes a routing engine, which sits between the Layer 2 (e.g., MAC) and Layer 3 (e.g., network) layers in the coordinator's network stack. FIG. 9 is a block diagram illustrating an example of a routing coordinator 900 comprising a L2.5 routing engine 902, according to some embodiments of the invention. The Layer 2.5 (L2.5) routing engine 902 may be configured to perform L2 address (e.g., MAC address) translation based on an L3 address, and to forward L2 data packets. The L2.5 routing engine may have any of the following components: L2-L3 address translator 904; and packet forwarding engine 906.

The translator 904 may maintain a L2-L3 address mapping table, in which each entry represents a roaming client MAC address-to-IP address mapping. In addition, the translator may be configured to understand L3 packet headers and retrieve corresponding L3 addresses.

The packet forwarding engine 906 may be configured to construct L2 packet headers, duplicate and redirect L2 data packets to different destinations, including an AP, a roaming client and/or internal higher layer network components.

The Layer 2.5 routing engine 902 in roaming coordinator 900 may be configured to follow the rules described below to relay L2 data packets.

Rules:
1) If the coordinator receives a data packet from the roaming client through a client-to-client connection: the L2 address translator may look into the L3 header and retrieve the destination IP address;

a) if the IP address is coordinator's, then the packet may be indicated to the upper layer;

b) if the IP address is unknown, then the packet forwarding engine may construct a new MAC header for the packet with addresses changed as illustrated in table 1000 of FIG. 10, and then may forward this packet to the AP; and c) if the packet is a broadcast or multicast packet, then both a) and b) may be performed.

2) If the coordinator receives a data packet from the access point through its infrastructure connection: the L2 address translator may look into the L3 header and retrieve the destination IP address:

a) if the IP address is the coordinator's, then the packet may be indicated to the upper layer;

b) if the IP address is the roaming client's, then the packet forwarding engine should construct a new MAC header for the packet with addresses changed as illustrated in table 1100 of FIG. 11, and then may forward this packet to the roaming client; and c) if the packet is a broadcast or multicast packet, then both a) and b) may be performed. If the coordinator has a packet generated from its upper layer components (e.g. TCP/IP):

3) If the coordinator receives a data packet from internal higher layer network components, then: the L2 address translator may look into the L3 header and retrieve the destination IP address;

a) if the IP address is the roaming client's, then the packet forwarding engine may construct a new MAC header for the packet with addresses as illustrated in table 1200 of FIG. 12, and then may forward this packet to the roaming client;

b) if the IP address is unknown, then the packet forwarding engine may construct a new MAC header for the packet with addresses as shown in table 1300 of FIG. 13, and then may forward this packet to the access point; and c) if the packet is a broadcast or multicast one, then both a) and b) may be performed.

Methods 300, 400 and 500, and acts thereof, various embodiments and variations of these methods and these acts and other methodologies and techniques described above, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (including methods 300, 400 and 500 or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 200, 1400 and 1500 described herein, may be distributed across one or more of such components, and may be in transition there between.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 14:
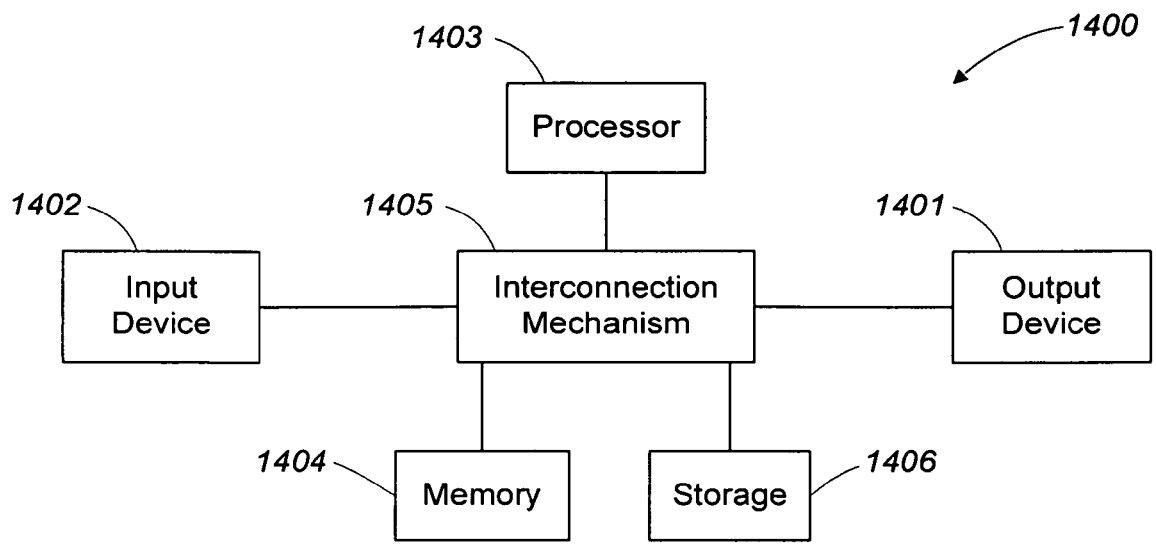
FIG. 14 is a block diagram illustrating an example of a computer system on which some embodiments of the invention may be implemented.
Figure 15:
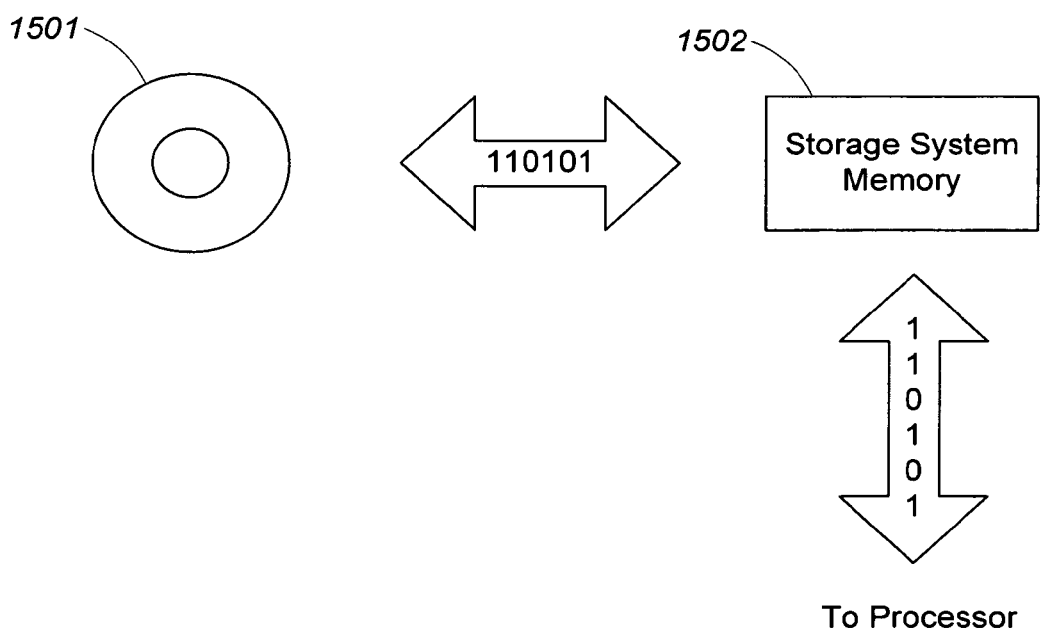
FIG. 15 is a block diagram illustrating an example of a storage system that may be used as part of the computer system to implement some embodiments of the invention.

It should be appreciated that any single component or collection of multiple components of a computer system, for example, any of the computer systems described in relation to FIGS. 2, 14 and 15, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 1400 such as that shown in FIG. 14. The computer system 1400 may include a processor 1403 connected to one or more memory devices 1404, such as a disk drive, memory, or other device for storing data. Memory 1404 is typically used for storing programs and data during operation of the computer system 1400. Components of computer system 1400 may be coupled by an interconnection mechanism 1405, which may include one or more busses (e.g., between components that are integrated within a same machine) and/or a network (e.g., between components that reside on separate discrete machines). The interconnection mechanism 1405 enables communications (e.g., data, instructions) to be exchanged between system components of system 1400. Computer system 1400 also includes one or more input devices 1402, for example, a keyboard, mouse, trackball, microphone, touch screen, and one or more output devices 1401, for example, a printing device, display screen, speaker. In addition, computer system 1400 may contain one or more interfaces (not shown) that connect computer system 1400 to a communication network (in addition or as an alternative to the interconnection mechanism 1405).

The storage system 806, shown in greater detail in FIG. 15, typically includes a computer readable and writeable nonvolatile recording medium 1501 in which signals are stored that define a program to be executed by the processor or information stored on or in the medium 1501 to be processed by the program. The medium may, for example, be a disk or flash memory. Typically, in operation, the processor causes data to be read from the nonvolatile recording medium 1501 into another memory 1502 that allows for faster access to the information by the processor than does the medium 1501. This memory 1502 is typically a volatile, random access memory such as a dynamic random access memory (DRAM) or static memory (SRAM). It may be located in storage system 1406, as shown, or in memory system 1404, not shown. The processor 1403 generally manipulates the data within the integrated circuit memory 1404, 1502 and then copies the data to the medium 1501 after processing is completed. A variety of mechanisms are known for managing data movement between the medium 1501 and the integrated circuit memory element 1404, 1502, and the invention is not limited thereto. The invention is not limited to a particular memory system 1404 or storage system 1406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1400 is shown by way of example as one type of computer system upon which various aspects of the invention may be practiced, it should be appreciated that aspects of the invention are not limited to being implemented on the computer system shown in FIG. 14. Various aspects of the invention may be practiced on one or more computers having a different architecture or components that that shown in FIG. 14.

Computer system 1400 may be a general-purpose computer system that is programmable using a high-level computer programming language. Computer system 1400 also may be implemented using specially-programmed, special-purpose hardware. In computer system 1400, processor 1403 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. A method of a roaming mobile user device discovering one or more candidates to serve as a roaming coordinator for a transition of the roaming mobile user device from a first wireless access point to a second wireless access point, the method comprising an act of:

(a) transmitting one or more discovery requests across one or more wireless networks, each discovery request requesting candidates to serve as a roaming coordinator, wherein the candidates are mobile user devices that are already connected to the second wireless access point and wherein act (a) comprises including, in the one or more discovery requests, a list of one or more methods of key exchange supported by the roaming mobile user device for establishing a client-to-client connection between the roaming coordinator and the roaming mobile user device and for encrypting data exchanged between the roaming coordinator and the roaming mobile user device.

2. The method of claim 1, wherein the act (a) comprises including, in the one or more discovery requests, one or more identifiers specifying the second wireless access point.

3. The method of claim 2, wherein the act (a) comprises including, in the one or more discovery requests, a basic service set identifier and/or a service set identifier of the second wireless access point.

4. The method of claim 1, further comprising acts of:
(b) receiving at least one response to the one or more discovery requests from at least one other mobile user device in physical proximity to the second wireless access point; and
(c) constructing a candidate list of roaming coordinator candidates, the candidate list listing the at least one other mobile user device.

5. The method of claim 4, wherein the act (c) comprises ordering the at least one other mobile user device on the candidate list according to one or more criteria.

6. The method of claim 5, wherein the act (c) comprises ordering the at least one other mobile user device on the candidate list according to at least one of the following criteria: strength of one or more signals exchanged between the at least one other mobile user device and the second wireless access point; quality of one or signals exchanged between the at least one other mobile user device and the second wireless access point; strength of a key exchange method specified in the at least one response received from the at least one other mobile user device; strength of an encryption method specified in the at least one response received from the at least one other mobile user device; and rate of data exchange supported by the at least one other mobile user device.

7. A system for discovering a candidate to serve as a roaming coordinator for a transition of a roaming mobile user device from a first wireless access point to a second wireless access point, the system comprising:
a mobile user device operative to receive from the roaming mobile user device across one or more wireless networks a discovery request requesting one or more candidates to serve as a roaming coordinator for the roaming mobile user device, and operative to send to the roaming mobile user device a response to the discovery request, wherein the candidates are mobile user devices that are already connected to the second wireless access point and wherein the discovery request includes a list of one or more methods of key exchange supported by the roaming mobile user device for establishing a client-to-client connection between the roaming coordinator and the roaming mobile user device and for encrypting data exchanged between the roaming coordinator and the roaming mobile user device, and
wherein the mobile user device is operative to read the list.

8. The system of claim 7, wherein the discovery request includes one or more identifiers specifying the second wireless access point, and
wherein the mobile user device is operative to read the one or more identifiers.

9. The system of claim 8, wherein the discovery request includes a basic service set identifier and/or a service set identifier of the second wireless access point, and
wherein the mobile user device is operative to read the basic service set identifier and/or the service set identifier.

10. The system of claim 7, wherein the mobile user device is operative to maintain a list of roaming user devices for which the mobile user device is a candidate to serve as a roaming coordinator.

11. The system of claim 7, wherein the mobile user device is located in physical proximity to the roaming mobile user device and has an established connection with a wireless access point, and
wherein the mobile user device is operative to transmit and receive communications with the wireless access point and the roaming mobile user device on behalf of the roaming mobile user device during a transition of the roaming user device from another wireless access point to the wireless access point.

12. The system of claim 7, wherein the mobile user device is operative to exchange cryptographic keys with the roaming mobile user device prior to the transition.

13. A computer program product comprising:
a computer-readable storage medium; and
computer-readable signals, stored on the computer-readable storage medium, that define instructions that, as a result of being executed by a computer, control the computer to perform a method of establishing a client-to-client connection between a roaming mobile user device and a second mobile user device that is already connected to a first wireless access point and will serve as a roaming coordinator to coordinate an exchange of data between the roaming mobile user device and the first wireless access point, the method comprising an act of:
(a) selecting, during a transition of the roaming mobile user device from a second wireless access point to the first wireless access point, the second mobile user device from a candidate list listing one or more mobile user devices that are identified as candidates by sending discovery requests to mobile user devices to serve as the roaming coordinator, wherein act (a) comprises including, in the discovery requests, a list of one or more methods of key exchange supported by the roaming mobile user device for establishing a client-to-client connection between the roaming coordinator and the roaming mobile user device and for encrypting data exchanged between the roaming coordinator and the roaming mobile user device.

14. The computer program product of claim 13, wherein the candidate list includes a plurality of mobile user devices that are candidates to serve as the roaming coordinator, and the candidate list is ordered according to one or more criteria, and
wherein the act (a) comprises selecting the second mobile user device from a top of the candidate list.

15. The computer program product of claim 14, wherein the method further comprises:
(b) attempting to establish a connection between the roaming mobile user device and the second mobile user device; and
(c) if the attempt fails, selecting a next mobile user device listed in the candidate list and attempting to establish a connection between the roaming mobile user device and the next mobile user device.

16. The computer program product of claim 13, wherein the method further comprises:
- (b) attempting to establish a connection between the roaming mobile user device and the second mobile user device; and
- (c) if the attempt fails, selecting another mobile user device listed in the candidate list and attempting to establish a connection between the roaming mobile user device and the other mobile user device.

17. The computer program product of claim 13, wherein the method further comprises:
- (b) establishing a connection between the roaming mobile user device and the second mobile user device.

* * * * *